US011040511B2

(12) United States Patent
Davidson et al.

(10) Patent No.: US 11,040,511 B2
(45) Date of Patent: Jun. 22, 2021

(54) FOLDING APPARATUS FOR FOLDING SHEET PACKAGING ELEMENTS

(71) Applicant: Tetra Laval Holdings & Finance S.A., Pully (CH)

(72) Inventors: Mark W. Davidson, Greer, SC (US); Mathias N. Coulomb, Greenville, SC (US); Roy A. Johnson, Marietta, GA (US); Joshua Alexander, Roebuck, SC (US); Alessandro Morselli, Castelfranco Emilia (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 270 days.

(21) Appl. No.: 15/552,313

(22) PCT Filed: Feb. 26, 2016

(86) PCT No.: PCT/EP2016/054067

§ 371 (c)(1),
(2) Date: Aug. 21, 2017

(87) PCT Pub. No.: WO2016/139138

PCT Pub. Date: Sep. 9, 2016

(65) Prior Publication Data

US 2018/0036986 A1 Feb. 8, 2018

(30) Foreign Application Priority Data

Mar. 2, 2015 (EP) .................................... 15157205

(51) Int. Cl.

*B31B 50/07* (2017.01)
*B31B 50/26* (2017.01)

(Continued)

(52) U.S. Cl.

CPC .............. *B31B 50/36* (2017.08); *B31B 50/07* (2017.08); *B31B 50/262* (2017.08); *B31B 50/58* (2017.08);

(Continued)

(58) Field of Classification Search

CPC ....... B31B 50/062; B31B 50/07; B31B 50/36; B31B 50/262; B31B 2100/002; B31B 2100/0028

See application file for complete search history.

(56) References Cited

U.S. PATENT DOCUMENTS 3,325,977 A * 6/1967 Rolf ........................ B65B 43/54 53/250
3,401,609 A * 9/1968 Nelson ...................... B65B 5/04 53/558

(Continued)

FOREIGN PATENT DOCUMENTS

DE 1611610 1/1971
WO WO 2004-073964 9/2004

OTHER PUBLICATIONS

International Search Report from corresponding PCT Application No. PCT/EP2016/054067 (5 pages).

*Primary Examiner* — Thanh K Truong
*Assistant Examiner* — David G Shutty
(74) *Attorney, Agent, or Firm* — Finnegan, Henderson, Farabow, Garrett & Dunner LLP

(57) ABSTRACT

Folding apparatus (1) for folding sheet packaging elements (2), comprising main conveying means (12), configured to sequentially receive the packaging elements (2) from a feeding station (13) and to advance each packaging element (2) along a first path (A), forming means (15), carried by the main conveying means (12) and configured to cooperate in use with a first face (**2*b*) of each packaging element (2) while the packaging element (2) is advanced along the first path (A), and folding means (18), advanced by auxiliary conveying means (16) along a second path (Q), having a first portion (Q1) distinct from the first path (A) and a second portion (Q2), which is in common with the first path (A) and along which the folding means (18**) cooperate with a second (Continued)

face (2*a*), opposite the first face (2*b*), of each packaging element (2) to fold the packaging element (2) against the forming means (15).

15 Claims, 8 Drawing Sheets

(51) Int. Cl.

| | |
|---|---|
| ***B31B 50/36*** | (2017.01) |
| ***B31B 50/58*** | (2017.01) |
| *B31B 100/00* | (2017.01) |
| *B31B 50/06* | (2017.01) |

(52) U.S. Cl.
CPC ....... *B31B 50/062* (2017.08); *B31B 2100/002* (2017.08); *B31B 2100/0028* (2017.08)

(56) References Cited

U.S. PATENT DOCUMENTS 3,461,642 A * 8/1969 Langen .................. B65B 43/10 53/456
3,716,962 A * 2/1973 Langen .................... B65B 7/20 53/209
3,893,380 A * 7/1975 Wallin ................... B31B 50/00 493/168
4,429,864 A * 2/1984 Scarpa .................... B65H 3/28 221/225
4,571,236 A * 2/1986 Adams ................... B31B 50/00 198/470.1
4,917,663 A * 4/1990 Pazdernik .............. B31B 50/00 271/107
5,531,661 A * 7/1996 Moncrief ............. B65B 43/265 493/313
5,697,877 A * 12/1997 Roth .................... B65B 43/265 493/162
6,260,690 B1 * 7/2001 Batzer .................... B65H 39/04 198/484.1
9,713,911 B2 * 7/2017 Cavazza ............... B65B 11/004
2006/0084560 A1 * 4/2006 Martini ..................... B31F 7/00 493/438
2006/0183616 A1 * 8/2006 Fulkerson .............. B31B 50/00 493/51
2010/0064633 A1 * 3/2010 Kalany .................. B31B 50/00 53/389.1
2015/0031519 A1 * 1/2015 Cavazza ............... B65B 43/265 493/441
2018/0036986 A1 * 2/2018 Davidson ............... B31B 50/07

* cited by examiner

FOLDING APPARATUS FOR FOLDING SHEET PACKAGING ELEMENTS

This is a National Phase of PCT Application No. PCT/EP2016/054067, filed Feb. 26, 2016, which claims the benefit of European Application No. 15157205.4 filed Mar. 2, 2015, both of which are incorporated herein by reference.

TECHNICAL FIELD

The present invention relates to a folding apparatus for folding sheet packaging elements, in particular cardboard blanks designed to be transformed into packaging boxes housing multiple packages or containers and adapted to be delivered to sales outlets.

The present invention may be advantageously but not exclusively used in plants for packaging pourable food products, such as beverages, milk, wine, tomato sauce, etc., in sealed packages, containers or the like, which are then packed in groups into the above-mentioned packaging boxes.

The present description refers to this specific field, although this is in no way intended to limit the scope of protection as defined by the accompanying claims.

BACKGROUND OF INVENTION

As known, the said sealed packages or containers are formed, filled and closed in a machine or a combination of machines and are then conveyed to an end packaging station, in which the sealed packages or containers are packaged in groups into packaging boxes.

Conveniently, packaging boxes are formed from respective sheet packaging elements, which are stored in a magazine and picked up from the latter to be then subjected to folding operations in the end packaging station.

Packaging elements are typically defined by plane, rectangular or square blanks, which, in some cases, may also be provided with handles to ease transportation of the resulting packaging boxes. Each handle is in general applied to one of the opposite faces of a relative packaging element so as to protrude from the latter.

Each packaging element is first folded to achieve a U-shaped configuration with a horizontal base portion and two vertical facing portions, extending orthogonally from opposite end edges of the base portion. One of the facing portions may be conveniently higher than the other so as to be then folded towards the latter; in practice, the protruding end of the higher facing portion is made horizontal so as to define a cover portion parallel to the base portion and connected to the other facing portion to define a quadrangular box.

The group of packages or containers is housed in use within the so formed box; in particular, the packages or containers rest on the base portion, are surrounded by the facing portions and are covered on top by the cover portion.

All portions of the so formed packaging box are provided with lateral flaps that are then folded to become vertical in order to block laterally the packages or containers housed within the packaging box itself.

A need particularly felt within the industry is to perform the above-described operations, and especially the ones for producing the U-shaped configuration of the packaging elements, at high speed and possibly in a continuous manner.

Another need particularly felt within the industry is to obtain the U-shaped configuration of each packaging element without using the packages or containers as a reference for the folding operations in such a way that these latter operations are not affected by the weight or format of the packages or containers destined to be housed in the final packaging box.

A further need particularly felt within the industry is to perform the above-described folding operations, and especially the ones for producing the U-shaped configuration of the packaging elements, irrespective of the sizes, material and thickness of the packaging elements to be folded.

DISCLOSURE OF INVENTION

It is therefore an object of the present invention to provide a folding apparatus for folding sheet packaging elements, which allows satisfying at least one of the aforementioned needs.

According to the present invention, there is provided a folding apparatus for folding sheet packaging elements, as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF PREFERRED EMBODIMENTS

Figure 1:
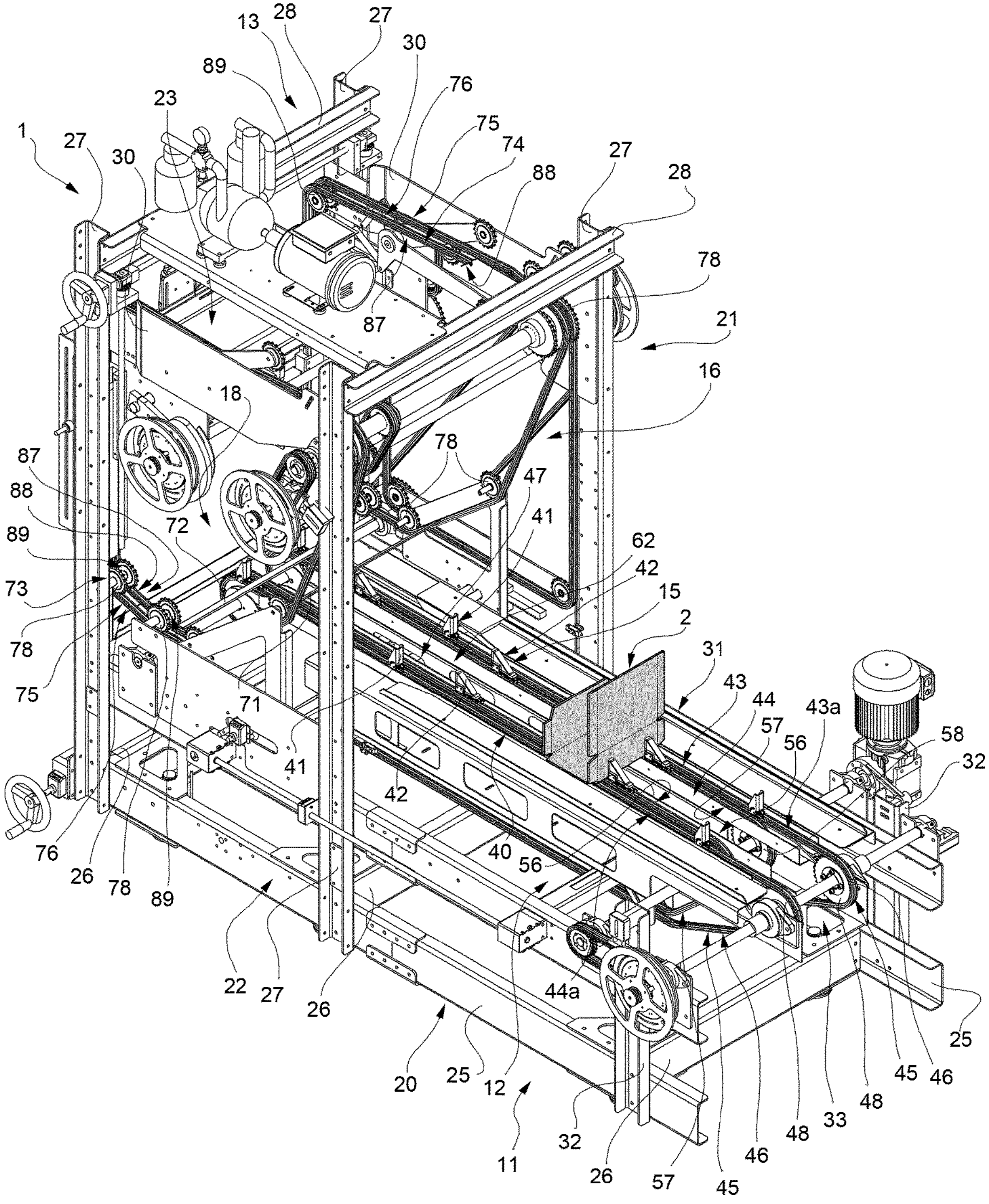
FIG. 1 shows a perspective view of a folding apparatus according to the present invention for folding sheet packaging elements, with parts removed for clarity.
Figure 2:
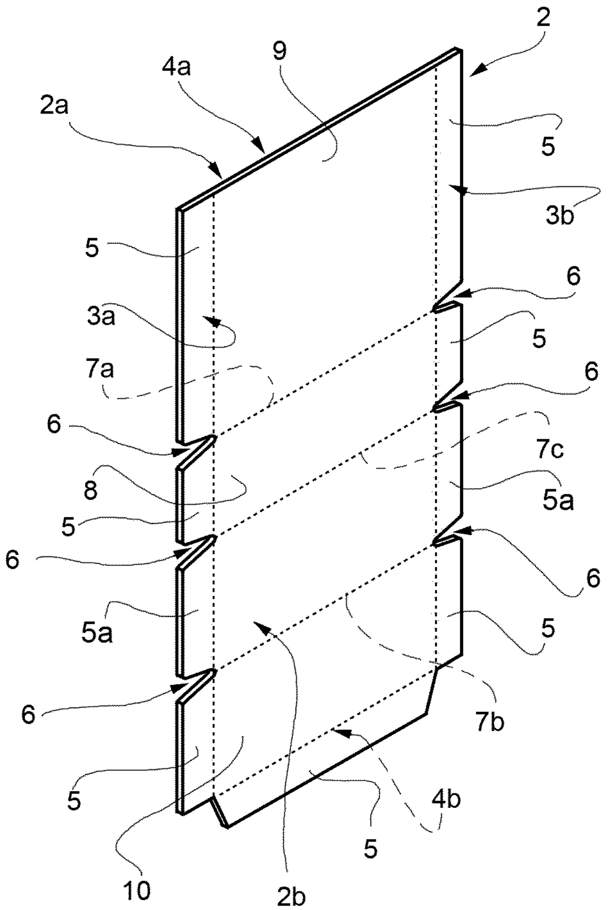
FIG. 2 shows a larger-scale perspective view of a packaging element in the condition in which it is fed to the apparatus of FIG. 1.
Figure 4:
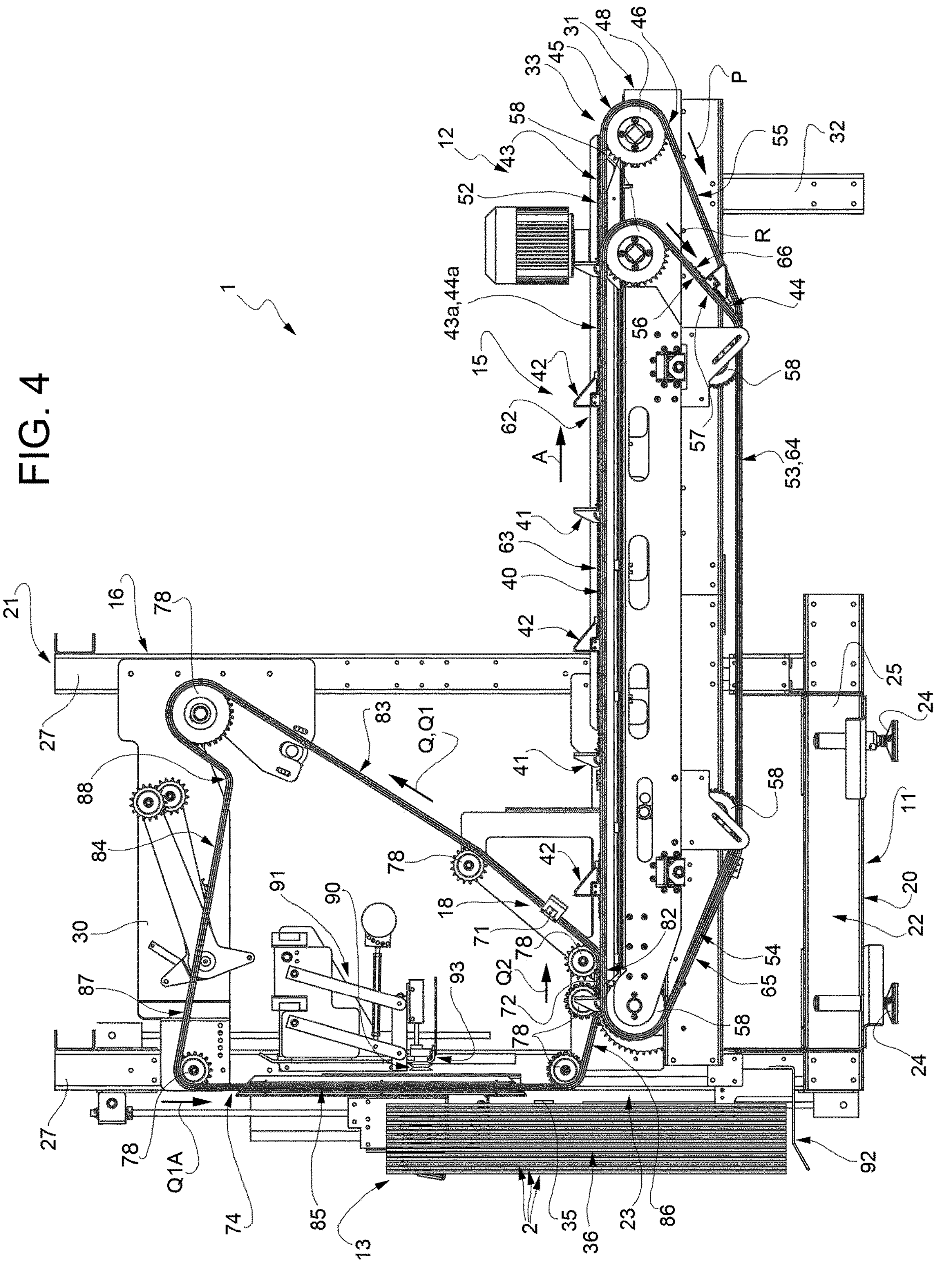
FIG. 4 shows a larger-scale side view of the apparatus of FIG. 1, with parts removed for clarity.

Number 1 in FIGS. 1 and 4 indicates as a whole a folding apparatus for folding sheet packaging elements 2, in particular cardboard blanks designed to be transformed into packaging boxes (known per se and not shown) housing multiple packages or containers (known per se and not shown).

As shown in detail in FIGS. 2 and 4 to 9, each packaging element 2 is fed to folding apparatus 1 in a vertical configuration, in which it extends along a vertical plane and presents a substantially rectangular profile. In particular, in its vertical configuration, each packaging element 2 is delimited by two opposite longitudinal sides 3*a*, 3*b* (see in particular FIG. 2) and by two opposite transversal sides 4*a*, 4*b*, each one joining corresponding ends of longitudinal sides 3*a*, 3*b*. More specifically, in the vertical configuration, transversal side 4*a* is arranged at an upper position than transversal side 4*b*.

Each packaging element 2 is also provided with a plurality of lateral flaps 5 protruding from sides 3*a*, 3*b* and 4*b* and destined to be folded towards these latter sides to form the final packaging box.

Each packaging element 2 is also provided with three pairs of lateral cuts or recesses 6, which are formed on opposite sides 3*a*, 3*b*.

Each packaging element 2 may further comprise two or more transversal crease lines, in the present case three transversal crease lines referenced as 7*a*, 7*b*, 7*c*, along which the packaging element 2 is destined to be folded to form the final packaging box.

Transversal crease lines 7*a*, 7*b*, 7*c* extend parallel to sides 4*a*, 4*b* and at different distances therefrom; in particular, crease line 7*a* is adjacent to side 4*a*, crease line 7*b* is adjacent to side 4*b* and crease line 7*c* is located at an intermediate position between crease lines 7*a* and 7*b*.

Figure 3:
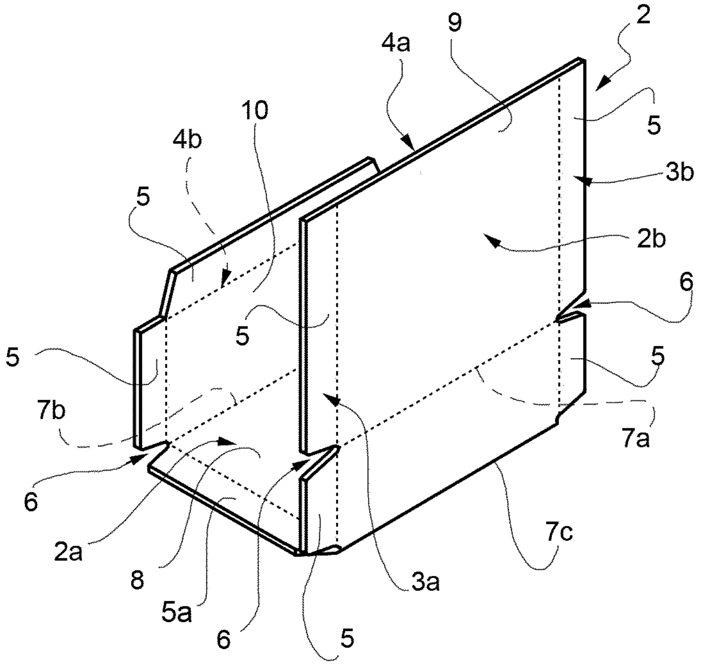
FIG. 3 shows a perspective view of the packaging element of FIG. 2 in the condition in which it is released by the apparatus of FIG. 1.

Folding apparatus 1 is in particular adapted to fold each packaging element 2 along crease lines 7*b*, 7*c* to define a sort of U-shaped configuration (see in particular FIGS. 1, 3 and 9), with an intermediate horizontal portion 8 delimited by the crease lines 7*b*, 7*c* themselves and two opposite vertical facing portions 9, 10 extending orthogonally from intermediate portion 8 and having different heights therefrom (FIGS. 1 and 3). In the present case, portion 9, delimited by transverse side 4*a*, is taller than portion 10 in the U-shaped configuration.

In the vertical configuration of each packaging element 2, portion 9 is located at an upper position than portion 8, which is in turn at an upper position than portion 10.

According to a possible alternative not shown, folding apparatus 1 may also produce the U-shaped configuration without providing any crease line on the relative packaging element 2.

With reference to FIGS. 1 and 4 to 9, folding apparatus 1 comprises:

- a support structure 11;
- a main conveying unit 12 mounted on support structure 11 and configured to sequentially receive packaging elements 2 from a feeding station 13 and to continuously advance each packaging element 2 along a given path A, in the example shown defined by a horizontal direction;
- forming means 15 carried by main conveying unit 12 and configured to cooperate in use with a first face 2*a* of each packaging element 2 while the latter is advanced along path A;
- an auxiliary conveying unit 16 mounted on support structure 11 in a position partially facing main conveying unit 12; and
- folding means 18 advanced continuously by auxiliary conveying unit 16 along an endless path Q, having a first portion Q1, distinct from path A, and a second portion Q2, which is in common, or aligned, with path A itself and along which the folding means 18 cooperate with a second face 2*b*, opposite face 2*a*, of each packaging element 2 to fold the latter against forming means 15.

With reference to FIGS. 1 and 4, support structure 11 basically comprises a horizontal base frame 20 and a tower frame 21, which protrudes upwards from a head portion 22 of base frame 20 and defines an inlet section 23 of folding apparatus 1.

In particular, base frame 20 rests on the floor through a plurality of height-adjustable feet 24 and comprises two longitudinal supporting beams 25 and a plurality of transverse supporting beams 26, three in the example shown. In particular, longitudinal supporting beams 25 extend parallel to path A, whilst transverse supporting beams 26 extend orthogonally to path A and to the longitudinal supporting beams 25.

Tower frame 21 comprises four struts 27, vertically extending upwards in pairs from respective head portions of longitudinal supporting beams 25; struts 27 are connected in pairs, in proximity of their tops, by respective transverse bars 28 parallel to transverse supporting beams 26; struts 27 are also connected in pairs, in proximity of their tops, by respective side rails 30 extending parallel to longitudinal supporting beams 25.

Support structure 11 further comprises a horizontal intermediate frame 31 arranged above and at a distance from base frame 20 and supported by struts 27 of tower frame 21 and by end struts 32, extending vertically upwards from respective longitudinal supporting beams 25 at an outlet section 33 of folding apparatus 1 and having smaller heights than those of struts 27. Intermediate frame 31 has a structure similar to that of base frame 20 and is not further described.

Main conveying unit 12 is supported by base frame 20 and intermediate frame 31 as well as by bottom portions of struts 27 and by end struts 32; main conveying unit 12 is located, for the most part, in the space delimited by base frame 20 intermediate frame 31, struts 27 and end struts 32.

Auxiliary conveying unit 16 is instead entirely supported by tower frame 21 and is arranged, for the most part, in the space delimited by the struts 27.

Feeding station 13 comprises a pair of lateral retainers 35 (FIGS. 5 to 9) carried by struts 27 of tower frame 21 at inlet section 23 and adapted to temporarily stop packaging elements 2 arriving in their vertical configurations from an upstream processing apparatus or from an upstream magazine (not shown).

In particular, at feeding station 13, packaging elements 2 are accumulated against each other and against lateral retainers 35 so as to be compacted into a batch 36 of adjacent packaging elements 2. More specifically, at feeding station 13, packaging elements 2 are supported in their vertical configurations by lateral horizontal flaps (known per se and not shown) engaging respective opposite and aligned recesses 6.

As visible in particular in FIGS. 1 and 4, main conveying unit 12 comprises a linear horizontal transport branch 40, defining path A and along which forming means 15 and packaging elements 2 are conveyed towards outlet section 33. In particular, during transfer from feeding station 13 to main conveying unit 12, each packaging element 2 passes from the vertical configuration to a configuration in which it lies, at least partially, with its face 2*a* on transport branch 40. The way in which packaging elements 2 are transferred from feeding station 13 to main conveying unit 12 will be explained in detail later on.

Auxiliary conveying unit 16 is arranged between feeding station 13 and main conveying unit 12 as well as at an upper position than that of main conveying unit 12.

With reference to FIGS. 1, and 4 to 9, forming means 15 comprise a plurality of first forming elements 41 adapted to cooperate with crease lines 7*b* of packaging elements 2, and a plurality of second forming elements 42 alternate to first forming elements 41 and adapted to cooperate with crease lines 7*c* of packaging elements 2.

In practice, during advancement along path A, each packaging element 2 is arranged between one first forming element 41 and one second forming element 42; more specifically, the first forming element 41 is arranged on the back of the packaging element 2 and pushes it along path A, whilst the second forming element 42 is placed in front of the packaging element 2 itself.

Main conveying unit 12 comprises a first conveying device 43, carrying first forming elements 41, and a second conveying device 44, carrying second forming elements 42; conveying devices 43, 44 have respective operative branches 43*a*, 44*a* parallel to one another, defining transport branch 40 and lying on a common horizontal plane.

In particular, conveying device 43 comprises two parallel conveyors 45, to which first forming elements 41 are rigidly secured and which define an endless path P for the first forming elements 41 themselves.

In the example shown, conveyors 45 comprise respective parallel endless chains 46 passing round a plurality of pairs of interconnected toothed wheels 48, four pairs in the example shown. One pair of toothed wheels 48 is motorized to impart motion to respective chains 46.

First forming elements 41 are secured to respective chains 46 and are uniformly distributed along the chains 46 themselves.

In particular, each first forming element 41 projects from the respective chain 46 and has a shape resembling a set square, with a profile of a right-angled triangle. In particular, each first forming element 41 is delimited by a base surface 49 attached to the respective chain 46, a forming surface 50 orthogonal to chain 46 as well as to base surface 49 and adapted to cooperate in use with a relative packaging element 2, and a slanted surface 51 connecting base surface 49 and forming surfaces 50. Forming surface 50 of each first forming element 41 extends orthogonally to the transport branch 40 of main conveying unit 12 when such first forming element 41 is advanced along path A.

Each chain 46 preferably lies on a substantially vertical plane and has a profile shaped like an isosceles trapezium.

Each chain 46 comprises:

- a horizontal transport portion 52 parallel to path A and defining, together with transport portion 52 of the other chain 46, operative branch 43*a;*
- a horizontal return portion 53, which is parallel to transport portion 52, is shorter than transport portion 52 and is arranged beneath transport portion 52; and
- slanted connection portions 54, 55, which connect respective end portions of transport portion 52 to corresponding end portions of return portion 53.

In particular, connection portion 54 is adjacent to inlet section 23 of folding apparatus 1, whilst connection portion 55 is adjacent to outlet section 33 of the folding apparatus 1 itself.

As visible in FIG. 1, conveying device 44 is arranged between conveyors 45 and has a structure very similar to that of conveying device 43.

In particular, even in this case, conveying device 44 comprises two parallel conveyors 56, to which second forming elements 42 are rigidly secured and which define an endless path R—for the most part parallel to path P—for the second forming elements 42 themselves.

In the example shown, conveyors 56 comprise respective parallel endless chains 57 passing round a plurality of pairs of interconnected toothed wheels 58, four pairs in this case. One pair of toothed wheels 58 is motorized to impart motion to respective chains 57.

Chains 57 are internally adjacent to respective chains 46 and define therebetween a gap 47, whose function will be clarified later on.

Second forming elements 42 are secured to respective chains 57 and are uniformly distributed along the chains 57 themselves.

In particular, each second forming element 42 projects from the respective chain 57 and has a shape resembling a set square, with a profile of a right-angled triangle. In particular, each second forming element 42 is delimited by a base surface 59 attached to the respective chain 57, a forming surface 60 orthogonal to chain 57 as well as to base surface 59 and adapted to cooperate in use with a relative packaging element 2, and a slanted surface 61 connecting base surface 59 and forming surface 60.

Forming surface 60 of each second forming element 42 extends orthogonally to the transport branch 40 of main conveying unit 12 when such second forming element 42 is advanced along path A. Forming surface 60 of each second forming element 42 faces forming surface 50 of the first forming element 41 cooperating in use with the same packaging element 2 and define, with the portion of the transport branch 40 comprised therebetween, a U-shaped profile forming a seat 62, within which the packaging element 2 itself is correspondingly folded by interaction with folding means 18.

Even in this case, each chain 57 preferably lies on a substantially vertical plane and has a profile shaped like a trapezium.

Each chain 57 comprises:

- a horizontal transport portion 63 coplanar with path A and transport portion 52 of chains 46 and defining, together with transport portion 63 of the other chain 57, operative branch 44*a;*
- a horizontal return portion 64, which is parallel to transport portion 63, is shorter than transport portion 63 and is arranged beneath the latter; and
- slanted connection portions 65, 66, which connect respective end portions of the transport portion 63 to corresponding end portions of the return portion 64.

In particular, connection portion 65 is adjacent to inlet section 23 of folding apparatus 1, whilst connection portion 66 is adjacent to outlet section 33 of the folding apparatus 1 itself.

As clearly shown in FIGS. 1 and 4, chains 57 are parallel to chains 46 except at connection portions 55, 66 adjacent to outlet section 33; as a matter of fact, transport portions 52 of chains 46 are longer than transport portions 63 of chains 57 at outlet section 33 to allow a completion of the pushing action on packaging elements 2 by first forming elements 41 at the exit of folding apparatus 1.

With reference to FIGS. 1 and 4 to 9, folding means 18 are carried by auxiliary conveying unit 16 and comprise a plurality of first folding bars 71 adapted to fold packaging elements 2 along crease lines 7*c* and against respective second forming elements 42, and a plurality of second folding bars 72 alternate to folding bars 71 and adapted to fold packaging elements 2 along crease lines 7*b* and against respective first forming elements 41.

In a manner analogous to main conveying unit 12, auxiliary conveying unit 16 comprises a first conveying device 73, carrying first folding bars 71, and a second conveying device 74, carrying second folding bars 72; first conveying device 73 and second conveying device 74 have respective folding branches 73*a*, 74*a* parallel to one another and lying, with operative branches 43*a*, 44*a* of main conveying unit 12, on a common horizontal plane.

In particular, first conveying device 73 comprises two parallel conveyors 75, to which first folding bars 71 are rigidly secured.

In the example shown, conveyors 75 comprise respective parallel endless chains 76 passing round a plurality of pairs of interconnected toothed wheels 78. One pair of toothed wheels 78 is motorized to impart motion to respective chains 76.

First folding bars 71 extend transversally to chains 76 and interconnect them; more specifically, first folding bars 71 are secured at their opposite ends to respective chains 76 and are uniformly distributed along the chains 76 themselves.

Each chain 76 preferably lies on a substantially vertical plane and comprises, by proceeding along path Q:

a horizontal folding portion 82 extending in use within the gap 47 between chains 57 and coplanar with transport portions 52, 63 of chains 46, 57 as well as with the folding portion 82 of the other chain 76;

an ascending ramp-shaped portion 83, slantingly extending upwards from folding portion 82;

a return portion 84 facing folding portion 82;

a vertical transfer portion 85 facing feeding station 13 and extending, in use, parallel to the packaging elements 2 forming the batch 36 at the feeding station 13 itself; and a descending ramp-shaped portion 86 connecting transfer portion 85 to folding portion 82.

As visible in FIG. 1, second conveying device 74 is arranged between conveyors 75 and has a structure very similar to that of first conveying device 73.

In particular, even in this case, second conveying device 74 comprises two parallel conveyors 87, to which second folding bars 72 are rigidly secured.

In the example shown, conveyors 87 comprise respective parallel endless chains 88 passing round a plurality of pairs of interconnected toothed wheels 89. One pair of toothed wheels 89 is motorized to impart motion to respective chains 88.

Chains 88 are internally adjacent to respective chains 76 and are interconnected by second folding bars 72; more specifically, second folding bars 72 are secured at their opposite ends to respective chains 88 and are uniformly distributed along the chains 88 themselves.

Chains 88 exactly have the same configurations as chains 76; therefore, the component parts of chains 88 will be indicated in the following description and drawings with the same references as those used for chains 76.

Ramp-shaped portions 83, 86, return portions 84 and transfer portions 85 of chains 76, 88 define portion Q1 of path Q, distinct from path A; folding portions 82 of chains 76, 88 define portion Q2 of path Q, in common with path A.

Transfer portions 85 of chains 76, 88 advantageously define an operative part Q1A of portion Q1 of path Q, along which folding bars 71, 72 interact in use with each packaging element 2 to transfer it from feeding station 13 to main conveying unit 12.

In particular, folding apparatus 1 further comprises a suction head 90 for separating one end packaging element 2 from the rest of the batch 36 so as to allow insertion of first folding bars 71 and second folding bars 72 between the separated end packaging element 2 and the batch 36.

In practice, suction head 90 is only used to separate the end packaging element 2 from the rest of the batch 36, whilst the first folding bars 71 and the second folding bars 72, moving along part Q1A of path Q, act on the separated end packaging element 2 to transfer it from feeding station 13 to main conveying unit 12.

Suction head 90 is suspended, through an articulated parallelogram 91, to tower frame 21 in a position facing feeding station 13 and is movable towards and away from the batch 36 between a rest position (FIG. 9), in which the suction head 90 is separated from the batch 36, and an operative position (FIG. 5), in which the suction head 90 is adjacent to the batch 36 to pick up the end packaging element 2 thereof.

In particular, in the rest position, suction head 90 faces portion 9 of the packaging element 2 to be separated from the rest of the batch 36; in the operative position, suction head 90 contacts portion 9 of the packaging element 2 to be separated from the batch 36 and suction is active.

Suction head 90 moves substantially parallel to path A; in this way, during its movement from the operative position to the rest position, suction head 90 separates the end packaging element 2 from the batch 36 by disengaging such packaging element 2 from the flaps on which it is suspended and by inclining it forward, towards main conveying unit 12.

During this step, the separated packaging element 2 rests with its flap 5 of side 4*b* on a fixed bottom plate 92 carried by support structure 11.

Suction head 90 is advantageously moved between a pair of stop rails 93 adapted to define an abutment for the portion 9 of the separated packaging element 2.

By considering the movement of forward inclination of the separated packaging element 2 towards main conveying unit 12, stop rails 93 are arranged between the rest and operative position of suction head 90, so as to allow disengagement of the suction head 90 from the packaging element 2 prior to reaching the rest position.

Figure 5:
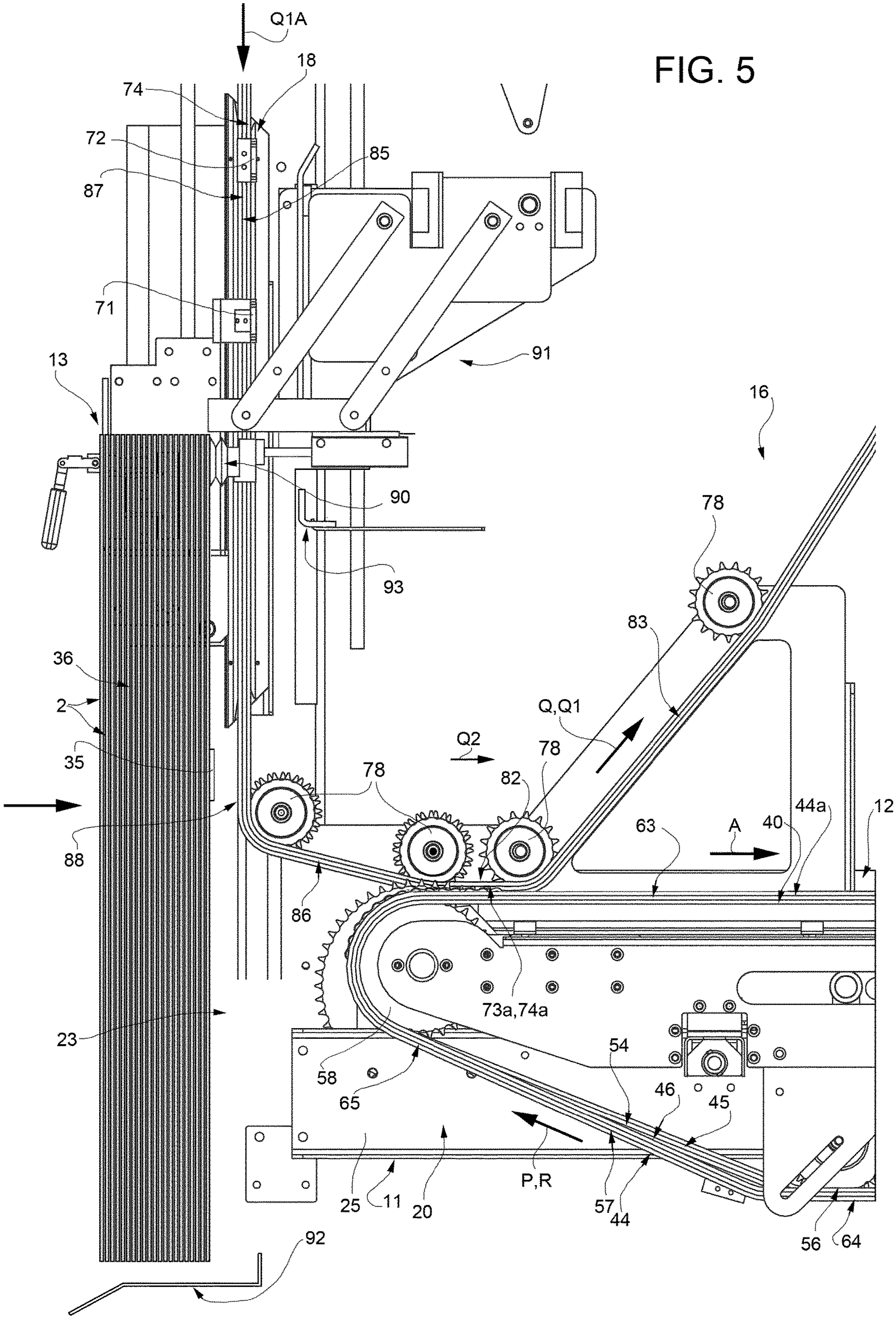
FIGS. 5 to 9 show larger-scale side views of a portion of the apparatus of FIG. 4, in different operative conditions and with parts removed for clarity.
Figure 6:
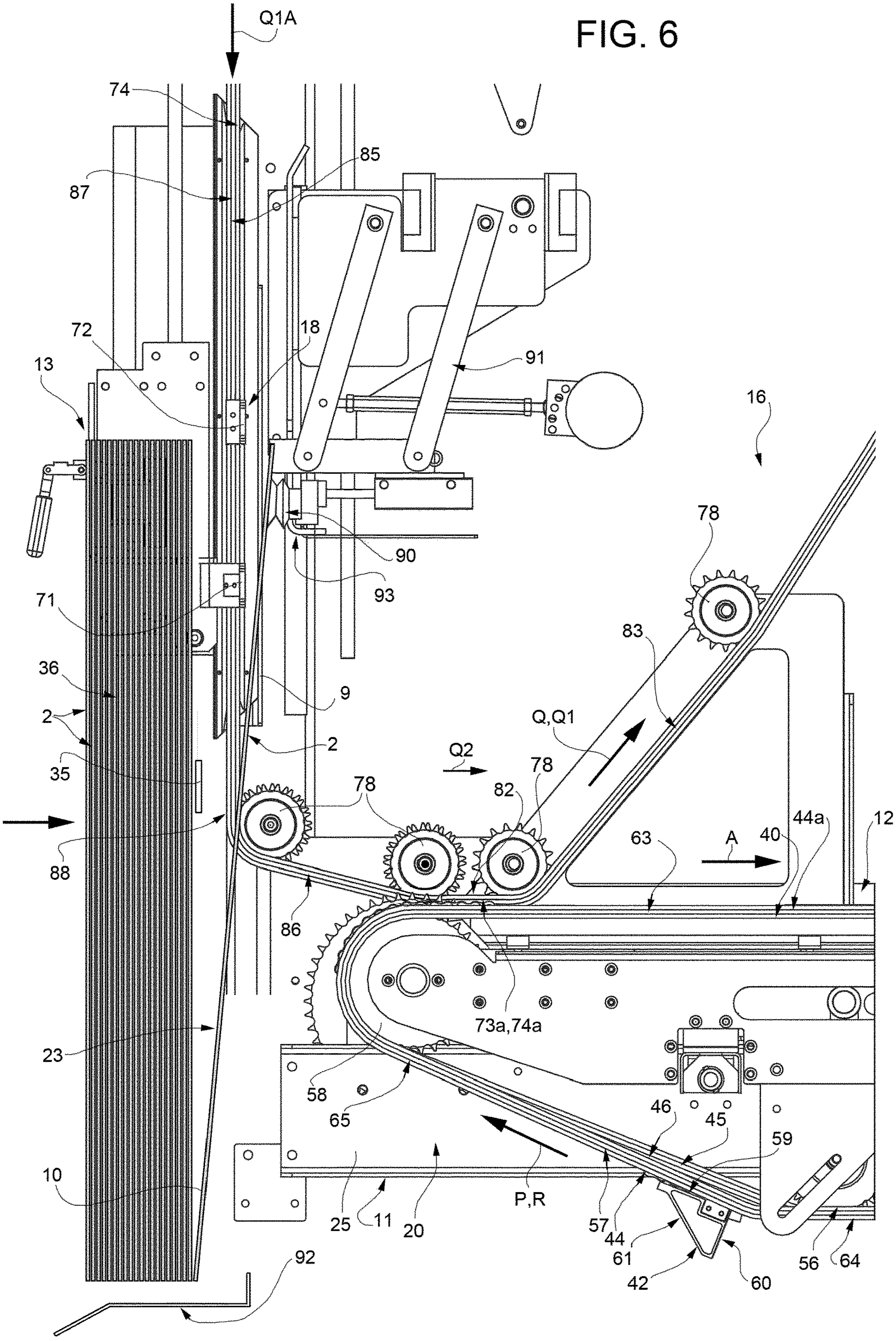
Figure 7:
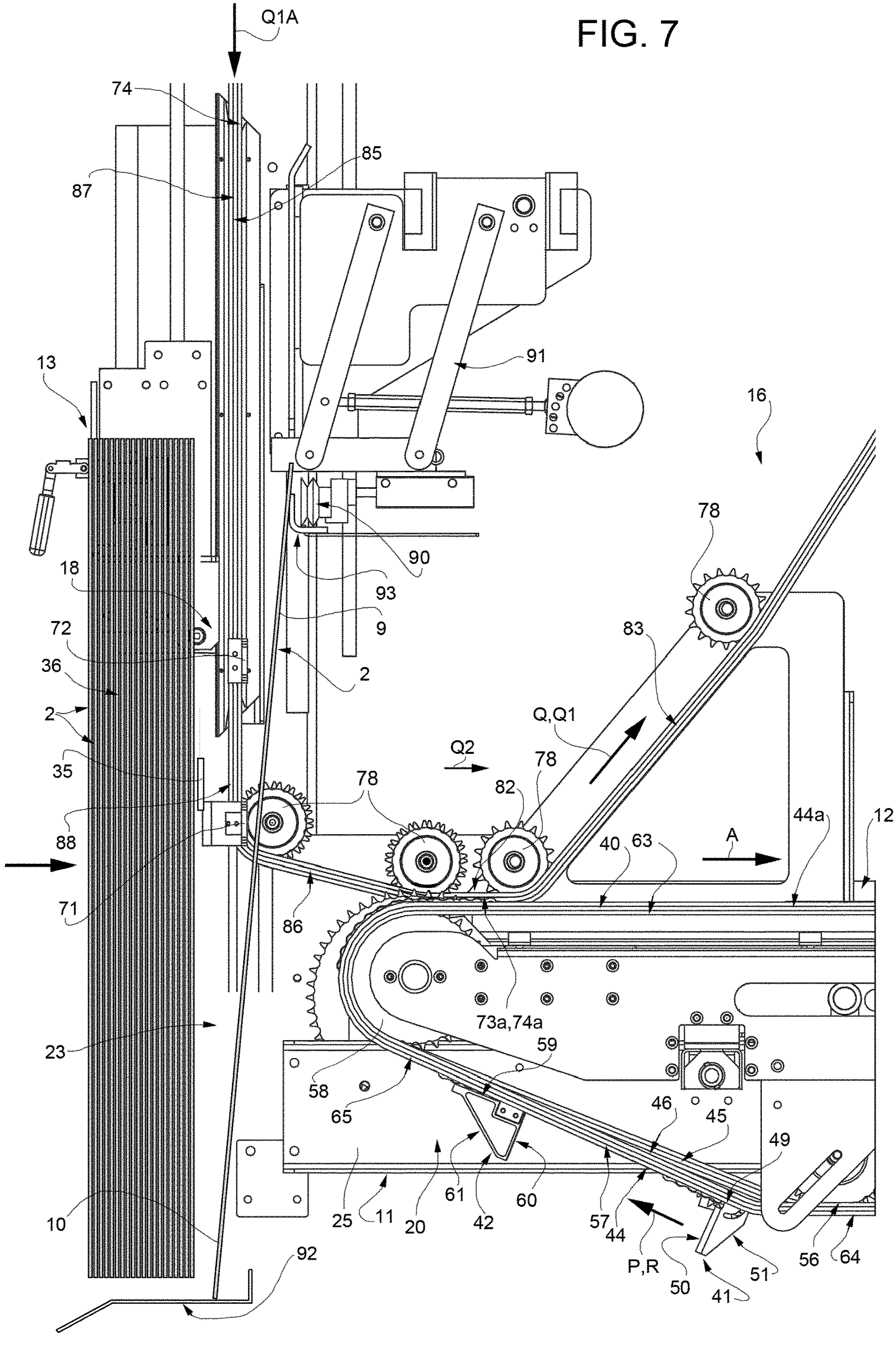

As visible in FIGS. 5 and 7, part Q1A of path Q advantageously extends between the rest position and the operative position of suction head 90, so as to allow interaction of first folding bars 71 and second folding bars 72 with the separated packaging elements 2 to transfer the latter to main conveying unit 12. In addition, part Q1A of path Q extends between the rest position of suction head 90 and stop rails 93; in this way, the separated packaging element 2 extends transversally to part Q1A of path Q and can be intercepted by first folding bars 71 and second folding bars 72.

Operation of folding apparatus 1 will be described with reference to the folding of one packaging element 2 and as of an initial condition (FIG. 5), in which:

such packaging element 2 is in its vertical configuration against lateral retainers 35 and cooperates with suction head 90 is in its operative position;

the first folding bar 71 and second folding bar 72 destined to cooperate with said packaging element 2 are moving along operative part Q1A of path Q towards feeding station 13; and the first forming element 41 and the second forming element 42, also destined to interact with the mentioned packaging element 2, are moving along portions 53, 64 of respective chains 46, 57.

Suction head 90 is moved towards its rest position and retains, by suction, portion 9 of the packaging element 9, which therefore moves together with the suction head 90 itself and separates from the batch 36. During this movement, the packaging element 2 disengages from the flaps on which it is suspended and, thanks to its deformability, also disengages from lateral retainers 35. In practice, the packaging element 2 leans forward, towards main conveying unit 12, and rests with its flap 5 of side 4*b* on bottom plate 92 (FIG. 7).

The movement of the packaging element 2 ends against stop rails 93, at which suction head 90 separates from the packaging element 2 and reaches its rest position (FIG. 7). In this condition, the packaging element 2 extends obliquely with respect to part Q1A of path Q and transversally to portions 85 and 86 of chains 76, 88; in this way, the packaging element 2 can be intercepted firstly by the first folding bar 71 and then by the second folding bar 72.

Figure 8:
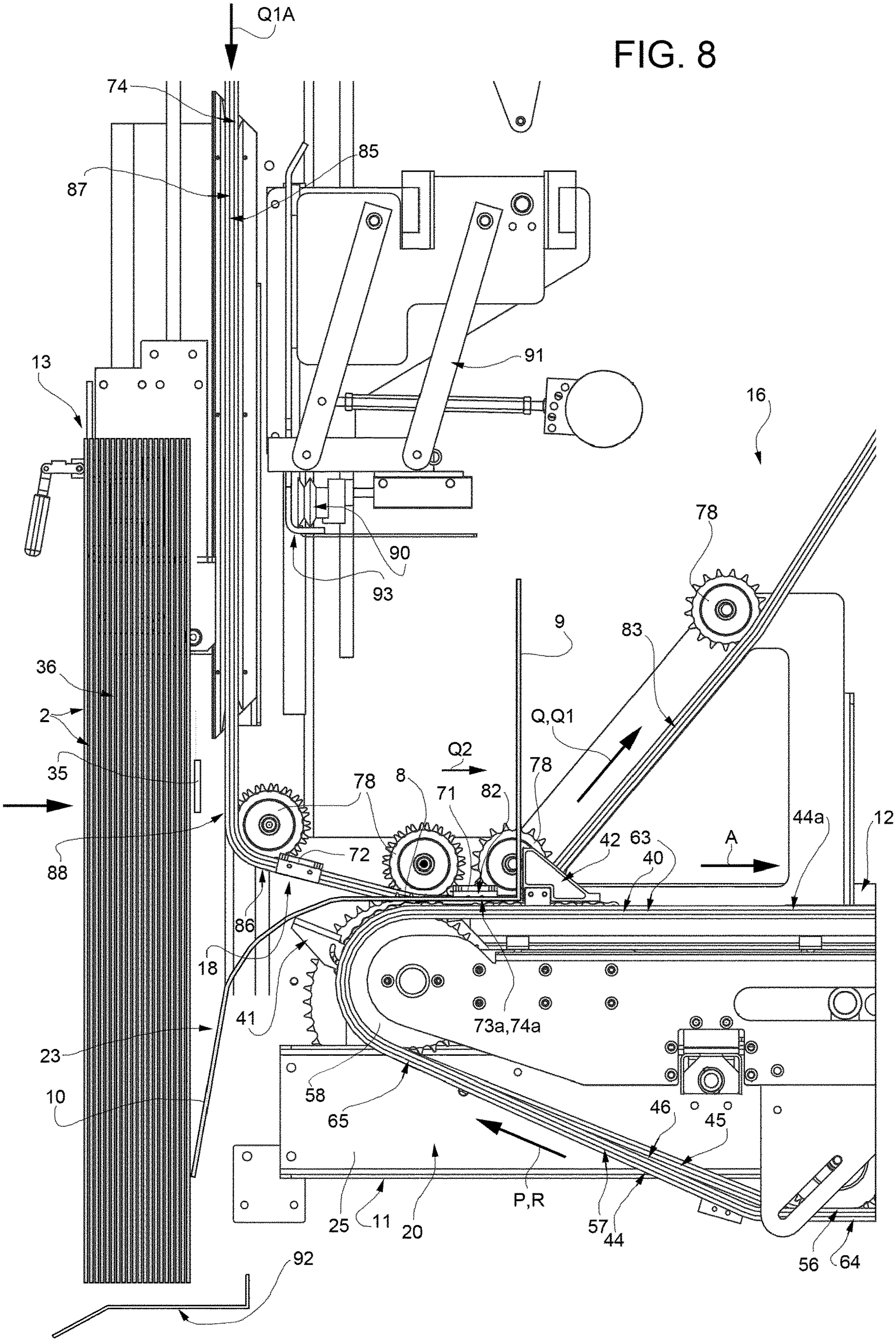

As shown in FIG. 8, the first folding bar 71, by moving along portions 85 and 86 of chains 76, bends portions 9 and 8 of the packaging element 2 onto transport branch 40 of main conveying unit 12.

In the meantime, the second forming element 42 destined to cooperate with crease line 7*c* of the packaging element 2 precede the packaging element 2 and the first folding bar 71 along path A; in this way, during advancement along portion Q2 of path Q, the first folding bar 71 folds the packaging element 2 along crease line 7*c* and against forming surfaces 60 of the second forming elements 42; at the end of this step, the portion 9 of the packaging element 2 extends orthogonally to the portion 8 and is advanced along path A in abutment against forming surfaces 60 of the second forming elements 42.

The first folding bar 71 comprises, at opposite ends thereof, protruding elements 100 that folds downwards the lateral flaps 5*a* interposed between the transversal crease lines 7*b* and 7*c*. In this way, the lateral flaps 5*a* do not interfere with the packages when the packages are inserted into the folded packaging element 2 in a direction perpendicular to path A.

Along the subsequent portions 83 of chains 76, the first folding bar 71 releases the packaging element 2.

In the meantime, first forming element 41 intercepts the portion 10 of the packaging element 2 while the second folding bar 72, moving along portions 86 of chains 88, precedes the first forming element 41 along path A.

Figure 9:
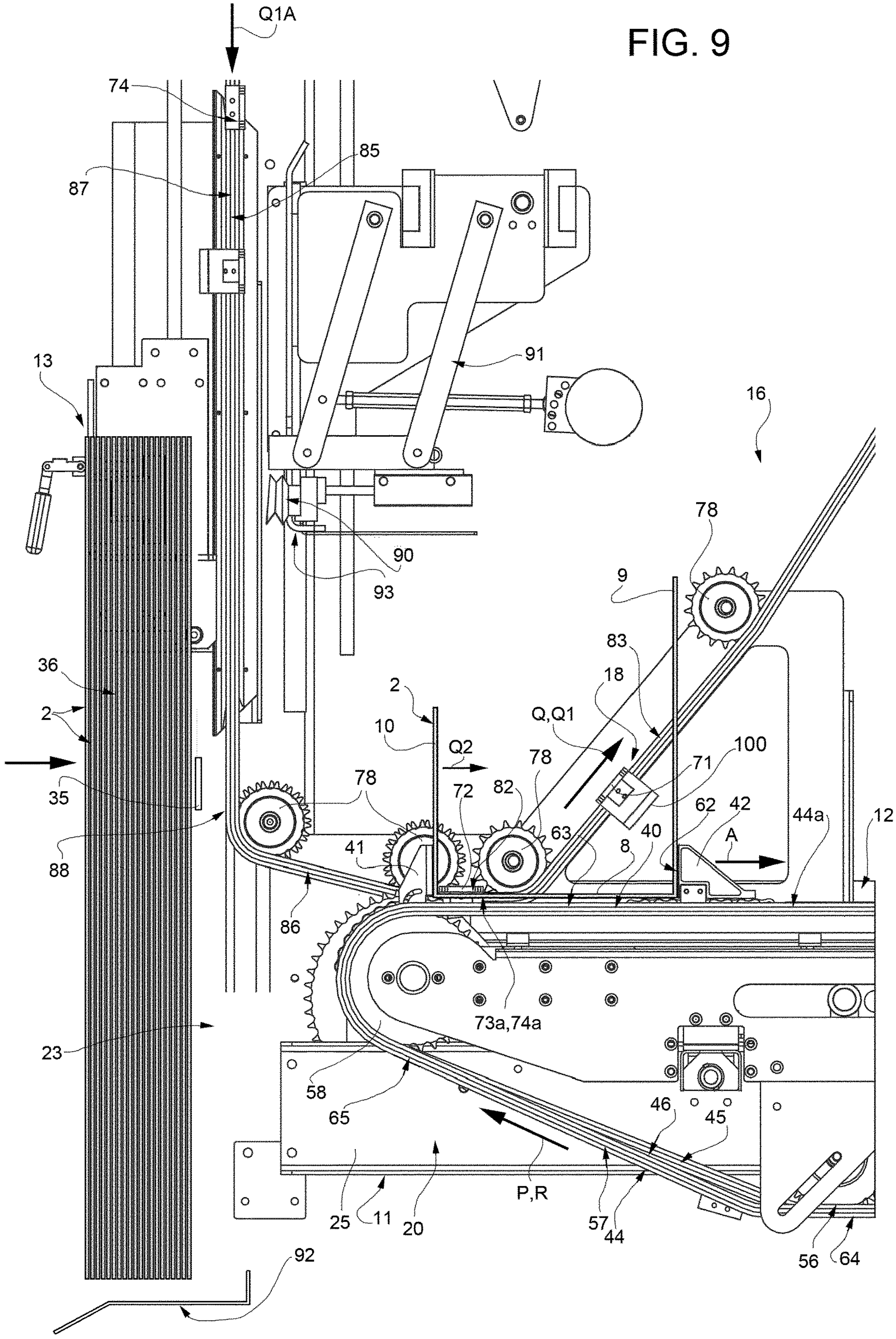

Along portions 82 of chains 88 and along portions 52 of chains 46 in common with the portions 82, the first forming elements 41 and the first folding bar 72 cooperate with the respective opposite faces 2*b*, 2*a* of the packaging element 2 to fold it along crease line 7*b* (FIG. 9).

At the end of this step, the packaging element 2 is therefore folded in the U-shaped configuration, in which it is housed within seat 62, delimited by the second forming elements 42 on the front side, with respect to path A, and by the first forming elements 41 on the back side.

Along the portions 83 of chains 88, even the folding bar 72 releases the packaging element 2, which is therefore advanced towards outlet section 33 by the first forming elements 41 and the second forming elements 42.

In particular, in the proximity of outlet section 33, the second forming elements 42 move away from the packaging element 2 by deviating along connection portions 66 of chains 57; the packaging element 2 is therefore pushed to outlet section 33 by first forming elements 41 only, prosecuting along the end part of transport portions 52 of chains 46.

The advantages of folding apparatus 1 according to the present invention will be clear from the foregoing description.

In particular, the described solution, with folding means 18 acting continuously on the packaging elements 2 to fold them against forming means 15 while being advanced along path A, allows to reach very high processing speeds as well as an improved reliability with respect to known solutions.

In addition, by folding the packaging elements 2 onto continuously-moving mechanical reference elements defined by forming means 15, instead of onto the packages or containers to be housed in the final packaging boxes, makes this operation independent from the weight or format of such packages or containers as well as from the material and/or format and/or thickness of the packaging elements 2.

In addition, the use of suction is limited to separate the packaging element 2 to be folded from the blank 36, while the transfer of such packaging element 2 to main conveying unit 12 is performed by the same folding means 18 used for folding the packaging elements 2. This also contributes to increase the processing speed, as it is not necessary to wait for the suction head 90 to perform the entire transfer.

Furthermore, the structures of conveying devices 43, 44, 73 and 74 allow to easily vary the spacing between adjacent first forming elements 41 and second forming elements 42 as well as between first folding bars 71 and second forming bars 72 to adapt to different formats of packaging elements 2 to be folded or different distances between the crease lines of such packaging elements 2.

Clearly, changes may be made to folding apparatus 1 as described herein without, however, departing from the scope of protection as defined in the accompanying claims.

In particular, chains 46, 57, 76, 88 may be replaced by other types of endless transport elements, such as belts.

In addition, each pair of folding bars 71, 72 may be replaced by one folding plate, whose front and rear edges perform the same functions as the replaced folding bars 71, 72.

The invention claimed is:

1. A folding apparatus for folding sheet packaging elements, comprising:

a feeding station configured to receive the packaging elements compacted into a batch;

a main conveyor configured to sequentially receive the packaging elements from the feeding station and to advance the packaging elements along a first path, wherein the feeding station is configured to receive the batch of the packaging elements while the packaging elements extend transversely to the first path;

a first forming surface and a second forming surface carried by the main conveyor and configured to engage the packaging elements while the packaging elements are advanced along the first path;

a first folding bar and a second folding bar advanced by an auxiliary conveyor along a second path, the second path having:

a first portion that is not parallel to the first path and includes an operative part extending adjacent to the feeding station, and a second portion that is parallel with the first path; and a suction head configured to separate an end packaging element from the batch of the packaging elements and to release the end packaging element at a separation position, wherein while the first folding bar is advanced along the second portion of the second path, the first folding bar is configured to engage a first face of the end packaging element to fold the end packaging element against the first forming surface while the second folding bar is configured to remain out of contact with the end packaging element, while the second folding bar is advanced along the second portion of the second path, the second folding bar is configured to engage the first face of the end packaging element to fold the end packaging element against the second forming surface, while the first folding bar is advanced along the first portion of the second path, the first folding bar is configured to be inserted between the end packaging element and the batch and to interact with the first face of the end packaging element at the separation position to transfer the end packaging element from the separation position to the main conveyor, and while the second folding bar is advanced along the operative part of the first portion of the second path, the second folding bar is configured to remain out of contact with the end packaging element.

2. The folding apparatus of claim 1, wherein the first forming surface and the second forming surface are configured to be continuously advanced along the first path by the main conveyor and the first folding bar and the second folding bar are configured to be continuously advanced along the second path by the auxiliary conveyor.

3. The folding apparatus of claim 1, wherein the first forming surface and the second forming surface are secured to the main conveyor.

4. The folding apparatus of claim 1, wherein the main conveyor comprises:

a linear transport branch defining the first path.

5. The folding apparatus of claim 4, wherein the first forming surface is configured to be orthogonal to the linear transport branch while the first forming surface is advanced along the linear transport branch, the second forming surface is configured to face the first forming surface and to be orthogonal to the linear transport branch while the second forming surface is advanced along the linear transport branch, and the first forming surface and the second forming surface are configured to define, with a portion of the linear transport branch situated therebetween, a U-shaped profile forming seat, wherein when the U-shaped profile forming seat houses a respective packaging element, the first folding bar and the second folding bar are configured to fold the respective packaging element.

6. The folding apparatus of claim 1, wherein the suction head is movable, along an axis parallel with the first path, towards and away from the batch of the packaging elements between:

a rest position, in which the suction head is separated from the batch of the packaging elements and from the separation position of the end packaging element, and an operative position, in which the suction head is adjacent to the batch of the packaging elements to pick up the end packaging element, and wherein the operative part of the first portion of the second path passes between a location corresponding to the rest position of the suction head and a location corresponding to the operative position of the suction head.

7. The folding apparatus of claim 6, further comprising:

stop means configured to define an abutment for the end packaging element before the suction head reaches the rest position while the suction head moves from the operative position to the rest position, wherein the end packaging element is separated from the suction head when the end packaging element abuts against the stop means.

8. The folding apparatus of claim 1, wherein the linear transport branch of the main conveyor extends horizontally, and wherein the operative part of the first portion of the second path extends vertically and parallel to the packaging elements at the feeding station.

9. The folding apparatus of claim 1, wherein the auxiliary conveyor is located between the feeding station and the main conveyor and is located above the main conveyor.

10. The folding apparatus of claim 5, wherein the main conveyor comprises:

a first conveying device carrying the first forming surface; and a second conveying device carrying the second forming surface, and wherein the first conveying device and the second conveying device comprise respective operative branches that are arranged to be parallel to each another and that define the linear transport branch.

11. The folding apparatus of claim 10, wherein the first conveying device comprises two parallel first conveyors, and wherein the second conveying device is arranged between the two parallel first conveyors.

12. The folding apparatus of claim 5, wherein the first folding bar and the second folding bar are spaced apart along the second path and are attached to different portions of the auxiliary conveyor, and wherein the first folding bar and the second folding bar are configured to cooperate with the first forming surface and the second forming surface, respectively, to fold the packaging elements.

13. The folding apparatus of claim 12, wherein the auxiliary conveyor comprises:

a third conveying device carrying the first folding bar; and a fourth conveying device carrying the second folding bar, and wherein the third conveying device and the fourth conveying device have respective folding branches parallel to one another and lying on a common plane with the linear transport branch.

14. The folding apparatus of claim 13, wherein the third conveying device comprises two parallel second conveyors, and wherein the fourth conveying device is arranged between the two parallel second conveyors.

15. The folding apparatus of claim 12, wherein the first folding bar is configured to cooperate with the first forming surface while the first folding bar is advanced along the second portion of the second path to fold a first portion of the end packaging element, and wherein the second folding bar is configured to cooperate with the second forming surface while the second folding bar is advanced along the second portion of the second path to fold a second portion of the end packaging element that is separate from the first portion of the end packaging element.

* * * * *